US012600810B2

(12) United States Patent
Krasovskiy et al.

(10) Patent No.: US 12,600,810 B2
(45) Date of Patent: Apr. 14, 2026

(54) PROCESS FOR PREPARING OLEFIN-ACRYLATE BLOCK COPOLYMERS

(71) Applicant: Dow Global Technologies LLC, Midland, MI (US)

(72) Inventors: Arkady L. Krasovskiy, Lake Jackson, TX (US); Evelyn Auyeung, Houston, TX (US); Bryan D. Stubbert, Midland, MI (US); Anna V. Davis, Midland, MI (US); Jianbo Hou, Midland, MI (US); Clark H. Cummins, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 598 days.

(21) Appl. No.: 17/997,486

(22) PCT Filed: Apr. 30, 2021

(86) PCT No.: PCT/US2021/030073
§ 371 (c)(1),
(2) Date: Oct. 28, 2022

(87) PCT Pub. No.: WO2021/222694
PCT Pub. Date: Nov. 4, 2021

(65) Prior Publication Data

US 2023/0167223 A1 Jun. 1, 2023

Related U.S. Application Data

(60) Provisional application No. 63/018,292, filed on Apr. 30, 2020.

(51) Int. Cl.
*C08F 293/00* (2006.01)

(52) U.S. Cl.
CPC ...... *C08F 293/005* (2013.01); *C08F 2438/03* (2013.01)

(58) Field of Classification Search
CPC ................ C08F 293/005; C08F 220/04; C08F 220/14–60
See application file for complete search history.

(56) References Cited

U.S. PATENT DOCUMENTS

| | | | |
|---|---|---|---|
| 6,747,111 | B2 | 6/2004 | Chiefari et al. |
| 7,858,706 | B2 | 12/2010 | Arriola et al. |
| 8,198,374 | B2 | 6/2012 | Arriola et al. |
| 8,318,864 | B2 | 11/2012 | Harris et al. |
| 8,609,779 | B2 | 12/2013 | Harris et al. |
| 8,686,087 | B2 | 4/2014 | Li Pi Shan et al. |
| 8,710,143 | B2 | 4/2014 | Arriola et al. |
| 8,716,400 | B2 | 5/2014 | Carnahan et al. |
| 8,785,551 | B2 | 7/2014 | Arriola et al. |
| 8,822,598 | B2 | 9/2014 | Li Pi Shan et al. |
| 9,243,090 | B2 | 1/2016 | Arriola et al. |
| 10,450,397 | B2 | 10/2019 | Harrisson et al. |
| 2008/0305143 | A1 | 12/2008 | Chen et al. |
| 2017/0096516 | A1 | 4/2017 | Harrisson et al. |
| 2017/0239360 | A1 | 8/2017 | Stayton et al. |

FOREIGN PATENT DOCUMENTS

| | | |
|---|---|---|
| WO | 199801478 | 1/1998 |
| WO | 2017044547 | 3/2017 |
| WO | 2019005680 | 1/2019 |

OTHER PUBLICATIONS

Benoit, "Development for a Universal Alkoxyamine for 'Living' Free Radical Polymerization" 1999, vol. 121, p. 3904-3920.
Davis, "Atom Transfer Radical Polymerization of tert-Butyl Acrylate and Preparation of Block Copolymers" 2000, vol. 33, p. 4039-4047.
Moad, "The Chemistry of Free Radical Polymerization", 1995, p. 53-95.
Williams, "The Construction of a Polyethylene Calibration Curve for Gel Permeation Chromotography Using Polystyrene Fractions," 1968, vol. 6, p. 621-624.
PCT/US2021/030073, International Search Report and Written Opinion with a mailing date of Jul. 29, 2021.
PCT/US2021/030073, International Preliminary Report on Patentability with a mailing date of Oct. 27, 2022.
Office Action from corresponding Chinese Patent Application: 2021800399664 dated Mar. 29, 2024.
Tsuruta, "Homopolymerization of Methyl a-Alkylacrylate", Industrial Chemical Magazine, 1964, vol. 67, No. 10, pp. 1638-1643.
Rzayev, Javid et al."Controlled Living Free-Radical Polymerization under Very High Pressure" Macromolecules, vol. 35, No. 5, Feb. 1, 2022 (Feb. 1, 2022) pp. 1489-1490.

*Primary Examiner* — Jeffrey S Lenihan

(57) ABSTRACT

The present disclosure relates to a process for preparing an olefin-acrylate block copolymer, the process comprising: a) performing reversible addition-fragmentation chain-transfer (RAFT) polymerization by combining RAFT materials comprising an acrylate monomer, a radical initiator, and a RAFT agent, thereby forming a macroinitiator; and b) combining reaction materials comprising an alpha-substituted acrylate, a radical initiator, and the macroinitiator, thereby forming the olefin-acrylate block copolymer.

6 Claims, 3 Drawing Sheets

PROCESS FOR PREPARING OLEFIN-ACRYLATE BLOCK COPOLYMERS

CROSS-REFERENCE TO RELATED APPLICATIONS

The present application claims the benefit of priority to U.S. Provisional Application No. 63/018,292, filed on Apr. 30, 2020, which is incorporated herein by reference in its entirety.

BACKGROUND

The present disclosure is directed to a process to synthesize olefin-acrylate block copolymers using reversible addition-fragmentation chain-transfer (RAFT) polymerization of acrylate monomers to prepare a functionalized polyacrylate that is subsequently reacted with an alpha-substituted acrylate monomer (such as an alpha-(alkyl) acrylate monomer or an alpha-(polymeryl) acrylate monomer). During the process, the alpha-substituted acrylate monomer, which is amenable to reaction using standard RAFT processes known in the art, is employed as a monomer that reacts with a polyacrylate produced by RAFT to form an olefin-acrylate block copolymer. This process and the resulting olefin-acrylate block copolymer have not been realized until the disclosures of the present application.

SUMMARY

The present disclosure is directed to a process for preparing an olefin-acrylate block copolymer, the process comprising:

a) performing reversible addition-fragmentation chain-transfer (RAFT) polymerization by combining RAFT materials comprising an acrylate monomer, a radical initiator, and a RAFT agent, thereby forming a macro-initiator; and b) combining reaction materials comprising an alpha-substituted acrylate, a radical initiator, and the macro-initiator, thereby forming the olefin-acrylate block copolymer.

The present disclosure is further directed to the olefin-acrylate block copolymer prepared by the present process.

DETAILED DESCRIPTION

Definitions

Figure 1A:
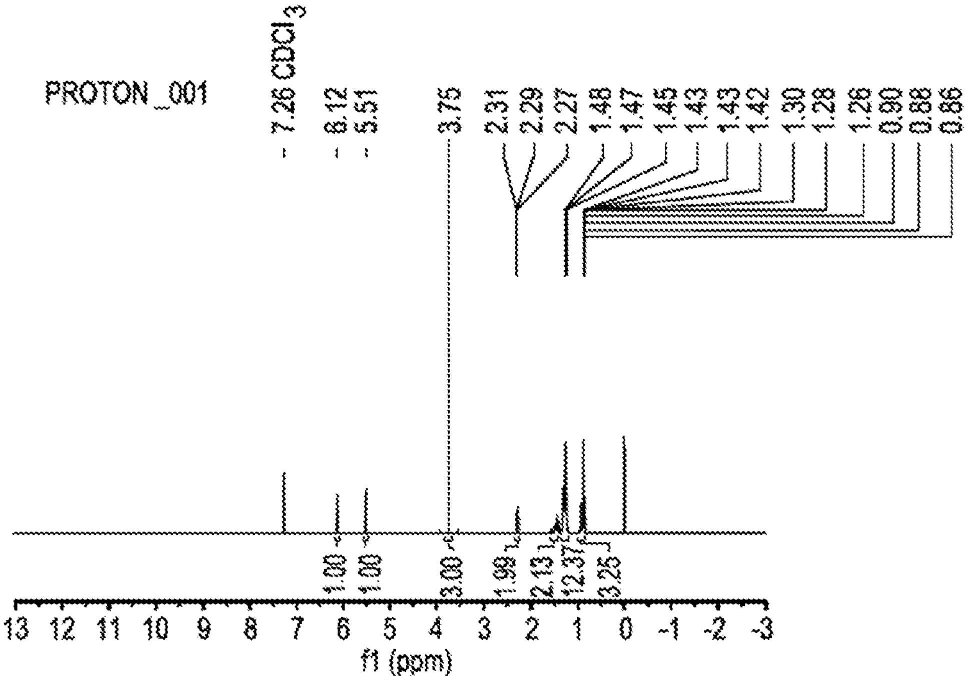
FIGS. 1A and 1B provide the $^{1}H$ NMR and $^{13}C$ NMR spectra, respectively, for Example 1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

Unless stated to the contrary, implicit from the context, or customary in the art, all parts and percents are based on weight.

For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The numerical ranges disclosed herein include all values from, and including, the lower and upper value. For ranges containing explicit values (e.g., 1, or 2, or 3 to 5, or 6, or 7), any subrange between any two explicit values is included (e.g., 1 to 2; 2 to 6; 5 to 7; 3 to 7; 5 to 6; etc.). The numerical ranges disclosed herein further include the fractions between any two explicit values.

The terms "comprising," "including," "having" and their derivatives are not intended to exclude the presence of any additional component, step or procedure, whether or not the same is specifically disclosed. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination.

As used herein, the terms "hydrocarbyl," "hydrocarbyl group," and like terms refer to compounds composed entirely of hydrogen and carbon, including aliphatic, aromatic, acyclic, cyclic, polycyclic, branched, unbranched, saturated, and unsaturated compounds. The terms "hydrocarbyl," "hydrocarbyl group," "alkyl," "alkyl group," "aryl," "aryl group," and like terms are intended to include every possible isomer, including every structural isomer or stereoisomer.

The term "cyclic" refers to a series of atoms in a polymer or compound where such a series includes one or more rings. Accordingly, the term "cyclic hydrocarbyl group" refers to a hydrocarbyl group that contains one or more rings. A "cyclic hydrocarbyl group," as used herein, may contain acyclic (linear or branched) portions in addition to the one or more rings.

The term "polymer" refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer," which refers to polymers prepared from a homogenous set of monomers, and the term "interpolymer" as defined below.

The term "interpolymer" refers to a polymer prepared by the polymerization of at least two different types of monomers. This term include both "copolymers," i.e., polymers prepared from two different types of monomers, and polymers prepared from more than two different types of monomers, e.g., terpolymers, tetrapolymers, etc. This term also embraces all forms of interpolymers, such as random, block, homogeneous, heterogeneous, etc.

A "polyolefin" is a polymer produced from the polymerization of an olefin as a monomer, where an olefin monomer is a linear, branched, or cyclic compound of carbon and hydrogen having at least one double bond. Accordingly, the term "polyolefin," as used herein, includes and covers the terms "ethylene-based polymer," "propylene-based polymer," "ethylene homopolymer," "propylene homopolymer," "ethylene/alpha-olefin interpolymer," "ethylene/alpha-olefin copolymer," "ethylene/alpha-olefin multiblock interpolymer," "block composite," "specified block composite," "crystalline block composite," "propylene/alpha-olefin interpolymer," and "propylene/alpha-olefin copolymer."

An "ethylene-based polymer" is a polymer that contains a majority amount of polymerized ethylene, based on the weight of the polymer, and, optionally, may further contain polymerized units of at least one comonomer. An "ethylene-based interpolymer" is an interpolymer that contains, in polymerized form, a majority amount of ethylene, based on the weight of the interpolymer, and further contains polymerized units of at least one comonomer. An "ethylene homopolymer" is a polymer that comprises repeating units derived from ethylene but does not exclude residual amounts of other components.

The term "ethylene/alpha-olefin interpolymer," as used herein, refers to a polymer that comprises, in polymerized form, a majority weight percent of ethylene (based on the weight of the interpolymer), and at least one comonomer that is an alpha-olefin. The ethylene/alpha-olefin interpolymer may be a random or block interpolymer. The terms "ethylene/alpha-olefin copolymer" and "ethylene/alpha-olefin multi-block interpolymer" are covered by the term "ethylene/alpha-olefin interpolymer."

The term "ethylene/alpha-olefin copolymer," as used herein, refers to a copolymer that comprises, in polymerized form, a majority weight percent of ethylene (based on the weight of the copolymer), and a comonomer that is an alpha-olefin, where ethylene and the alpha-olefin are the only two monomer types. The ethylene/alpha-olefin copolymer may be a random or block copolymer.

The term "ethylene/alpha-olefin multi-block interpolymer" or "olefin block copolymer," as used herein, refers to an interpolymer that includes ethylene and one or more copolymerizable alpha-olefin comonomers in polymerized form, characterized by multiple blocks or segments of two or more (preferably three or more) polymerized monomer units, the blocks or segments differing in chemical or physical properties. Specifically, this term refers to a polymer comprising two or more (preferably three or more) chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), region-regularity or region-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems. Non-limiting examples of the olefin block copolymers of the present disclosure, as well as the processes for preparing the same, are disclosed in U.S. Pat. Nos. 7,858,706 B2, 8,198,374 B2, 8,318,864 B2, 8,609,779 B2, 8,710,143 B2, 8,785,551 B2, and 9,243,090 B2, which are all incorporated herein by reference in their entirety.

The term "block composite" ("BC") refers to a polymer comprising three polymer components: (i) an ethylene-based polymer (EP) having an ethylene content from 10 mol % to 90 mol % (a soft copolymer), based on the total moles of polymerized monomer units in the ethylene-based polymer (EP); (ii) an alpha-olefin-based polymer (AOP) having an alpha-olefin content of greater than 90 mol % (a hard copolymer), based on the total moles of polymerized monomer units in the alpha-olefin-based polymer (AOP); and (iii) a block copolymer (diblock copolymer) having an ethylene block (EB) and an alpha-olefin block (AOB); wherein the ethylene block of the block copolymer is the same composition as the EP of component (i) of the block composite and the alpha-olefin block of the block copolymer is the same composition as the AOP of component (ii) of the block composite. Additionally, in the block composite, the compositional split between the amount of EP and AOP will be essentially the same as that between the corresponding blocks in the block copolymer. Non-limiting examples of the block composites of the present disclosure, as well as processes for preparing the same, are disclosed in U.S. Pat. Nos. 8,686,087 and 8,716,400, which are incorporated herein by reference in their entirety.

The term "specified block composite" ("SBC") refers to a polymer comprising three polymer components: (i) an ethylene-based polymer (EP) having an ethylene content from 78 mol % to 90 mol % (a soft copolymer), based on the total moles of polymerized monomer units in the ethylene-based polymer (EP); (ii) an alpha-olefin-based polymer (AOP) having an alpha-olefin content of from 61 mol % to 90 mol % (a hard copolymer), based on the total moles of polymerized monomer units in the alpha-olefin-based polymer (AOP); and (iii) a block copolymer (diblock copolymer) having an ethylene block (EB) and an alpha-olefin block (AOB); wherein the ethylene block of the block copolymer is the same composition as the EP of component (i) of the specified block composite and the alpha-olefin block of the block copolymer is the same composition as the AOP of component (ii) of the specified block composite. Additionally, in the specified block composite, the compositional split between the amount of EP and AOP will be essentially the same as that between the corresponding blocks in the block copolymer. Non-limiting examples of the specified block composites of the present disclosure, as well as processes for preparing the same, are disclosed in WO 2017/044547, which is incorporated herein by reference in its entirety.

The term "crystalline block composite" ("CBC") refers to polymers comprising three components: (i) a crystalline ethylene based polymer (CEP) having an ethylene content of greater than 90 mol %, based on the total moles of polymerized monomer units in the crystalline ethylene based polymer (CEP); (ii) a crystalline alpha-olefin based polymer (CAOP) having an alpha-olefin content of greater than 90 mol %, based on the total moles of polymerized monomer units in the crystalline alpha-olefin based copolymer (CAOP); and (iii) a block copolymer comprising a crystalline ethylene block (CEB) and a crystalline alpha-olefin block (CAOB); wherein the CEB of the block copolymer is the same composition as the CEP of component (i) of the crystalline block composite and the CAOB of the block copolymer is the same composition as the CAOP of component (ii) of the crystalline block composite. Additionally, in the crystalline block composite, the compositional split between the amount of CEP and CAOP will be essentially the same as that between the corresponding blocks in the block copolymer. Non-limiting examples of the crystalline block composites of the present disclosure, as well as the processes for preparing the same, are disclosed in U.S. Pat. No. 8,822,598 B2 and WO 2016/01028961 A1, which are incorporated herein by reference in its entirety.

A "propylene-based polymer" is a polymer that contains a majority amount of polymerized propylene, based on the weight of the polymer, and, optionally, may further contain polymerized units of at least one comonomer. A "propylene-based interpolymer" is an interpolymer that contains, in polymerized form, a majority amount of propylene, based on the weight of the interpolymer, and further contains polymerized units of at least one comonomer. A "propylene homopolymer" is a polymer that comprises repeating units derived from propylene but does not exclude residual amounts of other components.

The term "propylene/alpha-olefin interpolymer," as used herein, refers to a polymer that comprises, in polymerized form, a majority weight percent of propylene (based on the weight of the interpolymer), and at least one comonomer that is an alpha-olefin (where ethylene is considered an alpha-olefin). The propylene/alpha-olefin interpolymer may be a random or block interpolymer. The term "propylene/alpha-olefin interpolymer" includes the term "propylene/alpha-olefin copolymer."

The term "propylene/alpha-olefin copolymer," as used herein, refers to a copolymer that comprises, in polymerized form, a majority weight percent of propylene (based on the weight of the copolymer), and a comonomer that is an alpha-olefin, wherein propylene and the alpha-olefin are the only two monomer types. The propylene/alpha-olefin copolymer may be a random or block copolymer.

The terms "polymeryl," "polymeryl group" and like terms refer to a polymer missing one hydrogen.

The terms "polyolefinyl," "polyolefinyl group" and like terms refer to a polyolefin missing one hydrogen.

RAFT Polymerization

Step a) of the process of the present disclosure is directed to forming a functionalized polyacrylate via reversible addition-fragmentation chain-transfer (RAFT) polymerization. Specifically, step a) of the present process is directed to performing RAFT polymerization by combining RAFT materials comprising an acrylate monomer, a radical initiator, and a RAFT agent, thereby forming a macroinitiator. Techniques and conditions suitable for RAFT polymerization for step a) are known in the art and include, for example, those described in U.S. Pat. No. 6,747,111 and WO 98/01478, which are incorporated herein by reference.

In certain embodiments, the acrylate monomer of step a) has the formula (III):

(III)

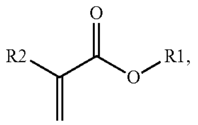

wherein R1 is hydrogen or a C1-C30 hydrocarbyl group and R2 is hydrogen or a methyl group.

In certain embodiments, R1 is a C1-C30 hydrocarbyl group that may be linear, branched, or cyclic. In further embodiments, R1 is a C1-C30 alkyl group that may be linear, branched, or cyclic. For example, R1 may be a linear, branched, or cyclic alkyl group comprising from 1 to 30 carbon atoms, or from 1 to 20 carbon atoms, or from 1 to 10 carbon atoms, or from 1 to 8 carbon atoms.

In certain embodiments, the RAFT agent has the formula (IV):

(IV)

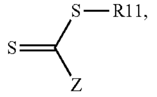

wherein:

R11 is selected from the group consisting of optionally substituted alkyl; an optionally substituted saturated, unsaturated or aromatic carbocyclic or heterocyclic ring; optionally substituted alkylthio; optionally substituted alkoxy; and optionally substituted dialkylamino; and where R11• is a free-radical leaving group that can initiate free-radical polymerization;

Z is selected from the group consisting of hydrogen, chlorine, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—$O_2$CR"), optionally substituted carbamoyl (—CONR"$_2$), cyano (—CN), dialkyl- or diarylphosphonato [—P(═O)OR"$_2$], and dialkyl- or diarylphosphinato [—P(═O)R"$_2$]; and R" is selected from the group consisting of optionally substituted C1-C18 alkyl, C2-C18 alkenyl, aryl, heterocyclyl, aralkyl, alkaryl wherein the substituents are independently selected from the group that consists of epoxy, hydroxy, alkoxy acyl, acyloxy, carboxy (and salts), sulfonic acid (and salts), alkoxy- or aryloxycarbonyl, isocyanato, cyano, silyl, halo, and dialkylamino.

Examples of the RAFT agent of the formula (IV) include but are not limited to those disclosed in U.S. Pat. No. 6,747,111 B2 and WO 98/01478.

The radical initiator is the source of free radicals. Suitable radical initiators of the present disclosure are compounds that provide free radicals that add to monomers to produce propagating radicals. Propagating radicals are radical species that have added one or more monomer units and are capable of adding further monomer units.

The source of initiating radicals may be any suitable method of generating free radicals that provide free radicals that add to monomers to produce propagating radicals. This includes such sources as the thermally induced homolytic scission of a suitable compound(s) (such as peroxides, peroxyesters, or azo compounds), the spontaneous generation from monomer, redox initiating systems, photochemical initiating systems or high energy radiation such as electron beam, X- or γ-radiation. The initiating system is chosen such that under the reaction conditions there is no substantial adverse interaction of the initiator or the initiating radicals with the transfer agent under the conditions of the experiment. The initiator should also have the requisite solubility in the reaction medium or monomer mixture.

Examples of suitable radical initiators for the present disclosure include azo compounds and peroxides such as: 2,2'-azobis(isobutyronitrile), 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1- bis(hydroxymethyl)2-hydroxyethyl]propionamide), 2,2'-azobis(2-methyl-N-[1,1-bis(hydroxymethyl)ethyl] propionamide), 2,2'-azobis[2-methy-N(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite.

Free radicals may also be generated thermally from the monomer, by photochemistry, from redox initiation systems or by a combination of these methods. Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems. Redox initiator systems are chosen to have the requisite solubility in the reaction medium or monomer mixture and have an appropriate rate of radical production under the conditions of the polymerization; these initiating systems may include combinations of the following oxidants and reductants:

oxidants: potassium peroxydisulfate, hydrogen peroxide, t-butyl hydroperoxide.

reductants: iron (II), titanium (III), potassium thiosulfite, potassium bisulfite.

Other suitable initiating systems are described in other texts. See, for example, Moad and Solomon "The Chemistry of Free Radical Polymerization", Pergamon, London, 1995, pp 53-95.

In certain embodiments, the macroinitiator formed in step a) has the formula (V):

(V)

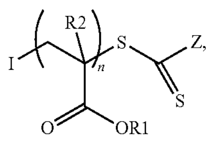

wherein:

- R1 is hydrogen or a C1-C30 hydrocarbyl group;
- R2 is hydrogen or a methyl group;
- Z is selected from the group consisting of hydrogen, chlorine, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—$O_2CR$"), optionally substituted carbamoyl (—$CONR"_2$), cyano (—CN), dialkyl- or diarylphosphonato [—P(═O)$OR"_2$], and dialkyl- or diarylphosphinato [—P(═O)$R"_2$];
- R" is selected from the group consisting of optionally substituted C1-C18 alkyl, C2-C18 alkenyl, aryl, heterocyclyl, aralkyl, alkaryl wherein the substituents are independently selected from the group that consists of epoxy, hydroxy, alkoxy acyl, acyloxy, carboxy (and salts), sulfonic acid (and salts), alkoxy- or aryloxycarbonyl, isocyanato, cyano, silyl, halo, and dialkylamino;
- I. is a free radical initiator or a free radical leaving group resulting from R11 of the RAFT agent that initiates free radical polymerization; and
- n is from 2 to 500.

R1 of the macroinitiator of the formula (V) is the same as (and may be any embodiment of) the R1 of the acrylate monomer of the formula (III).

In certain embodiments, step a) of the present process may be performed neat. In further embodiments, the RAFT materials in step a) of the present process further comprise a solvent, such as a hydrocarbon solvent.

In certain embodiments, step a) of the present process is performed at a temperature that is suitable for RAFT polymerization. For example and without limitation, step a) of the present process may be performed at a temperature from 40 to 150° C.

The amounts and ratios of the RAFT materials in step a) may be adjustable and will be known by a person of ordinary skill in the art.

Reaction with an Alpha-Substituted Acrylate

Step b) of the present process is directed to reacting a functionalized polyacrylate prepared in step a) with an alpha-substituted acrylate, such as an alpha-(alkyl) acrylate or an alpha-(polymeryl) acrylate, to form an olefin-acrylate block copolymer. Specifically, step b) of the present process is directed to combining reaction materials comprising an alpha-substituted acrylate, a radical initiator, and the macroinitiator of the formula (V), thereby forming the olefin-acrylate block copolymer.

In certain embodiments, the alpha-substituted acrylate has the formula (II):

(II)

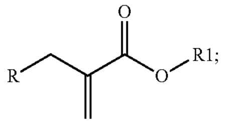

wherein R is a C1-C26 hydrocarbyl group or a polyolefinyl group; and

R1 is hydrogen or a C1-C30 hydrocarbyl group.

R1 may be any embodiment as described previously.

In certain embodiments, R is a C1-C26 hydrocarbyl group. In embodiments wherein R is a C1-C26 hydrocarbyl group, R may be a C1-C26 alkyl group that may be linear, branched, or cyclic. For example, R may be a linear, branched, or cyclic alkyl group comprising from 1 to 26 carbon atoms, or from 1 to 10 carbon atoms, or from 1 to 8 carbon atoms.

In further embodiments, R is a polyolefinyl group. In certain embodiments, R is a polyolefinyl group, which can be defined by the properties of R—H, wherein R—H has a number average molecular weight of greater than 365 g/mol. In further embodiments, R is a polyolefinyl group, which can be defined by the properties of R—H, wherein R—H has a number average molecular weight from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.

In further embodiments, R is a polyolefinyl group, which can be defined by the properties of R—H, wherein R—H has a density from 0.850 to 0.965 g/cc, or from 0.860 to 0.950 g/cc, or from 0.865 to 0.925 g/cc.

In further embodiments, R is a polyolefinyl group, which can be defined by the properties of R—H, wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.

In further embodiments, R is a polyolefinyl group, which can be defined by the properties of R—H, wherein R—H has a number average molecular weight distribution (Mw/Mn or PDI) from 1 to 10, or from 1 to 7, or from 1 to 5, or from 2 to 4.

In certain embodiments, R is an ethylene homopolymeryl group comprising units derived from ethylene.

In certain embodiments, R is an ethylene/alpha-olefin interpolymeryl group comprising units derived from ethylene and at least one C3-C30 alpha-olefin. The C3-C30 alpha-olefin may be, for example, 1-butene, 4-methyl-1-pentene, 1-hexene, 1-octene, 1-decene, 1-dodecene, 1-tetradecene, 1-hexadecene, or 1-octadecene.

In certain embodiments, R is an ethylene/alpha-olefin copolymeryl group comprising units derived from ethylene and a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

In certain embodiments, R is an ethylene/alpha-olefin multi-block interpolymeryl group or olefin block copolymeryl group as defined herein.

In further embodiments, R is a polymeryl group of a block composite, a specified block composite, or a crystalline block composite, as defined herein.

In certain embodiments, R is a propylene homopolymeryl group comprising units derived from propylene.

In certain embodiments, R is a propylene/alpha-olefin interpolymeryl group comprising units derived from propylene and at least one comonomer that is ethylene or a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

In certain embodiments, R is a propylene/alpha-olefin copolymeryl group comprising units derived from propylene and a comonomer that is ethylene or a C3-C30 alpha-olefin. The C3-C30 alpha-olefin may be, for example, propylene, 1-butene, 4-methyl-1-pentene, 1-hexene, 1-octene, 1-decene, 1-dodecene, 1-tetradecene, 1-hexadecene, or 1-octadecene.

The alpha-substituted acrylate of the formula (II) may be prepared by any suitable process. A non-limiting process for preparing the alpha-substituted acrylate of the formula (II) is the process disclosed in copending U.S. Provisional Application Nos. 62/954,941 and 62/954,956. For example, the alpha-substituted acrylate of the formula (II) may be prepared by combining materials comprising an alpha-(halomethyl) acrylate and an organometallic compound of the formula $R_2Zn$ or $R_3Al$, wherein R is as defined herein. In such a non-limiting process, a nucleophilic substitution reaction occurs whereby a halogen is a leaving group that is replaced by an R of the organometallic compound of the formula $R_2Zn$ or $R_3Al$.

In certain embodiments, the resulting olefin-acrylate block copolymer of the present process has the formula (VI):

(VI)

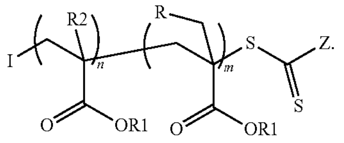

Clearly, each of R, R1, R2, I, Z, and n of the olefin-acrylate block copolymer of the formula (VI) is defined above in connection with steps a) and b) of the present process, and m is from 1 to 50. When m=1, the block copolymer is a linear olefin-acrylate diblock copolymer. When m>1, a comb block copolymer is formed.

In certain embodiments, step b) of the present process may be performed neat. In further embodiments, the reaction materials in step b) of the present process further comprise a solvent, such as a hydrocarbon solvent.

For example and without limitation, step c) of the present process may be performed at a temperature from 40 to 150° C.

The amounts and ratios of the reaction materials in step b) may be adjustable and will be known by a person of ordinary skill in the art.

The present process may be described by, but is not limited to, the following scheme.

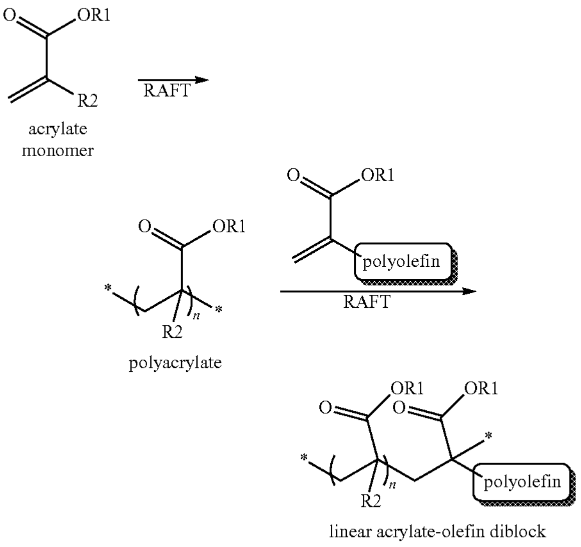

Specific embodiments of the present disclosure include but are not limited to the following:

1. A process for preparing an olefin-acrylate block copolymer, the process comprising:
   a) performing reversible addition-fragmentation chain-transfer (RAFT) by combining RAFT materials comprising an acrylate monomer, a radical initiator, and a RAFT agent, thereby forming a macroinitiator; and
   b) combining reaction materials comprising an alpha-substituted acrylate, a radical initiator, and the macroinitiator, thereby forming the olefin-acrylate block copolymer.
2. The process of embodiment 1, wherein:
   the alpha-substituted acrylate has the formula (II):

(II)

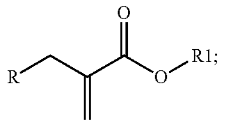

the acrylate monomer has the formula (III):

(III)

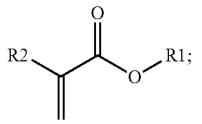

the RAFT agent has the formula (IV):

(IV)

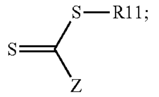

the macroinitiator has the formula (V):

(V)

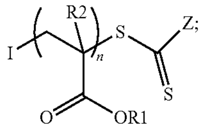

the olefin-acrylate block copolymer has the formula (VI):

(VI)

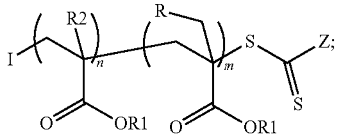

and wherein:

each R1 independently is hydrogen or a C1-C30 hydrocarbyl group;

each R2 independently is hydrogen or a methyl group;

each R independently is a C1-C26 hydrocarbyl group or a polyolefinyl group;

R11 is selected from the group consisting of optionally substituted alkyl; an optionally substituted saturated, unsaturated or aromatic carbocyclic or heterocyclic ring; optionally substituted alkylthio; optionally substituted alkoxy; and optionally substituted dialkylamino; and where R11• is a free-radical leaving group that can initiate free-radical polymerization;

each Z is selected from the group consisting of hydrogen, chlorine, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—$O_2$CR"), optionally substituted carbamoyl (—CONR"$_2$), cyano (—CN), dialkyl- or diaryl-phosphonato [—P(═O)OR"$_2$], and dialkyl- or diaryl-phosphinato [—P(═O)R"$_2$];

each R" independently is selected from the group consisting of optionally substituted C1-C18 alkyl, C2-C18 alkenyl, aryl, heterocyclyl, aralkyl, alkaryl wherein the substituents are independently selected from the group that consists of epoxy, hydroxy, alkoxy acyl, acyloxy, carboxy (and salts), sulfonic acid (and salts), alkoxy- or aryloxycarbonyl, isocyanato, cyano, silyl, halo, and dialkylamino;

each I• independently is a radical initiator or a free radical leaving group resulting from R11 of the RAFT agent that initiates free radical polymerization;

each n independently is from 2 to 500; and m is from 1 to 50.

3. The process of any of the previous embodiments, wherein each R1 independently is a C1-C30, or C1-C10, or C1-C8 alkyl group that is linear, branched, or cyclic.

4. The process of any of the previous embodiments, wherein each R independently is a C1-C26 hydrocarbyl group.

5. The process of embodiment 4, wherein each R independently is a C1-C26, or C1-C10, or C1-C8 alkyl group that is linear, branched, or cyclic.

6. The process of any of embodiments 1-3, wherein each R independently is a polyolefinyl group.

7. The process of embodiment 6, wherein the polyolefinyl group is an ethylene-based polymeryl group.

8. The process of embodiment 7, wherein the polyolefinyl group is an ethylene homopolymeryl group comprising units derived from ethylene.

9. The process of embodiment 7, wherein the polyolefinyl group is an ethylene/alpha-olefin interpolymeryl group comprising units derived from ethylene and a C3-C30 alpha-olefin.

10. The process of embodiment 7, wherein the polyolefinyl group is an ethylene/alpha-olefin copolymeryl group comprising units derived from ethylene and a C3-C30 alpha-olefin.

11. The process of embodiment 9 or 10, wherein the C3-C30 alpha-olefin is selected from the group consisting of propylene, 1-butene, 1-hexene, and 1-octene.

12. The process of embodiment 7, wherein the polyolefinyl group is an ethylene/alpha-olefin multiblock interpolymeryl group.

13. The process of embodiment 6, wherein the polyolefinyl group is selected from the group consisting of a polymeryl group of a block composite, a specified block composite, and a crystalline block composite.

14. The process of embodiment 6, wherein the polyolefinyl group is a propylene-based polymeryl group.

15. The process of embodiment 14, wherein the polyolefinyl group is a propylene homopolymeryl group comprising units derived from propylene.

16. The process of embodiment 14, wherein the polyolefinyl group is a propylene/alpha-olefin interpolymeryl group comprising units derived from propylene and either ethylene or a C4-C30 alpha-olefin.

17. The process of embodiment 14, wherein the polyolefinyl group is a propylene/alpha-olefin copolymeryl group comprising units derived from propylene and either ethylene or a C4-C30 alpha-olefin.

18. The process of embodiment 16 or 17, wherein the C4-C30 alpha-olefin is selected from the group consisting of 1-butene, 1-hexene, and 1-octene.
19. The process of any of embodiments 6-18, wherein the polyolefinyl group can be defined by the properties of R—H, and wherein R—H has a number average molecular weight of greater than 365 g/mol.
20. The process of any of embodiments 6-19, wherein the polyolefinyl group can be defined by the properties of R—H, and wherein R—H has a number average molecular weight of from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.
21. The process of any of embodiments 6-20, wherein the polyolefinyl group can be defined by the properties of R—H, and wherein R—H has a density from 0.850 to 0.965 g/cc, or from 0.860 to 0.950 g/cc, or from 0.865 to 0.925 g/cc.
22. The process of any of embodiments 6-21, wherein the polyolefinyl group can be defined by the properties of R—H, and wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.
23. The process of any of embodiments 6-22, wherein the polyolefinyl group can be defined by the properties of R—H, and wherein R—H has a number average molecular weight distribution (Mw/Mn) from 1 to 10, or from 1 to 7, or from 1 to 5, or from 2 to 4.
24. The process of any of embodiments 2-23, wherein m is 1.
25. The process of any of the previous embodiments, wherein each of steps a) and b) is performed at a temperature from 40° C. to 150° C.
26. The process of any of the previous embodiments, wherein the alpha-substituted acrylate is prepared by a process comprising combining starting materials comprising an alpha-(halomethyl) acrylate and an organometallic compound of the formula $R_2Zn$ or $R_3Al$, wherein the alpha-(halomethyl) acrylate has the formula (I):

(I)

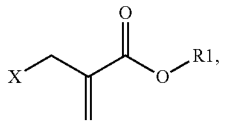

wherein:

X is a halide, and R and R1 are as defined above.
27. The process of any of the previous embodiments, wherein each radical initiator is an azo compound or a peroxide.
28. The process of any of the previous embodiments, wherein the RAFT materials and/or the reaction materials further comprise a solvent.
29. An olefin-acrylate block copolymer having the formula (VI):

(VI)

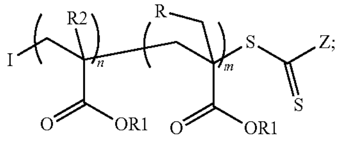

and wherein:

each R1 independently is hydrogen or a C1-C30 hydrocarbyl group;

R2 is hydrogen or a methyl group;

R is a C1-C26 hydrocarbyl group or a polyolefinyl group;

R11 is selected from the group consisting of optionally substituted alkyl; an optionally substituted saturated, unsaturated or aromatic carbocyclic or heterocyclic ring; optionally substituted alkylthio; optionally substituted alkoxy; and optionally substituted dialkylamino; and where R11• is a free-radical leaving group that can initiate free-radical polymerization;

Z is selected from the group consisting of hydrogen, chlorine, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—$O_2$CR"), optionally substituted carbamoyl (—CONR"$_2$), cyano (—CN), dialkyl- or diaryl-phosphonato [—P(═O)OR"$_2$], and dialkyl- or diaryl-phosphinato [—P(═O)R"$_2$];

each R" independently is selected from the group consisting of optionally substituted C1-C18 alkyl, C2-C18 alkenyl, aryl, heterocyclyl, aralkyl, alkaryl wherein the substituents are independently selected from the group that consists of epoxy, hydroxy, alkoxy acyl, acyloxy, carboxy (and salts), sulfonic acid (and salts), alkoxy- or aryloxycarbonyl, isocyanato, cyano, silyl, halo, and dialkylamino;

I. is a radical initiator or a free radical leaving group resulting from R11 of the RAFT agent that initiates free radical polymerization;

n is from 2 to 500; and m is from 1 to 50.
30. The olefin-acrylate block copolymer of embodiment 29, wherein each R1 independently is a C1-C30, or C1-C10, or C1-C8 alkyl group that is linear, branched, or cyclic.
31. The olefin-acrylate block copolymer of embodiment 29 or 30, wherein R is a C1-C26 hydrocarbyl group.
32. The olefin-acrylate block copolymer of embodiment 31, wherein R is a C1-C26, or C1-C10, or C1-C8 alkyl group that is linear, branched, or cyclic.
33. The olefin-acrylate block copolymer of embodiment 29 or 30, wherein R is a polyolefinyl group.
34. The olefin-acrylate block copolymer of embodiment 33, wherein the polyolefinyl group is an ethylene-based polymeryl group.
35. The olefin-acrylate block copolymer of embodiment of 34, wherein the polyolefinyl group is an ethylene homopolymeryl group comprising units derived from ethylene.
36. The olefin-acrylate block copolymer of embodiment 34, wherein the polyolefinyl group is an ethylene/ alpha-olefin interpolymeryl group comprising units derived from ethylene and a C3-C30 alpha-olefin.

37. The olefin-acrylate block copolymer of embodiment 34, wherein the polyolefinyl group is an ethylene/alpha-olefin copolymeryl group comprising units derived from ethylene and a C3-C30 alpha-olefin.

38. The olefin-acrylate block copolymer of embodiment 36 or 37, wherein the C3-C30 alpha-olefin is selected from the group consisting of propylene, 1-butene, 1-hexene, and 1-octene.

39. The olefin-acrylate block copolymer of embodiment 34, wherein the polyolefinyl group is an ethylene/alpha-olefin multiblock interpolymeryl group.

40. The olefin-acrylate block copolymer of embodiment 33, wherein the polyolefinyl group is selected from the group consisting of a polymeryl group of a block composite, a specified block composite, and a crystalline block composite.

41. The olefin-acrylate block copolymer of embodiment 33, wherein the polyolefinyl group is a propylene-based polymeryl group.

42. The olefin-acrylate block copolymer of embodiment 41, wherein the polyolefinyl group is a propylene homopolymeryl group comprising units derived from propylene.

43. The olefin-acrylate block copolymer of embodiment 41, wherein the polyolefinyl group is a propylene/alpha-olefin interpolymeryl group comprising units derived from propylene and either ethylene or a C4-C30 alpha-olefin.

44. The olefin-acrylate block copolymer of embodiment 41, wherein the polyolefinyl group is a propylene/alpha-olefin copolymeryl group comprising units derived from propylene and either ethylene or a C4-C30 alpha-olefin.

45. The olefin-acrylate block copolymer of embodiment 43 or 44, wherein the C4-C30 alpha-olefin is selected from the group consisting of 1-butene, 1-hexene, and 1-octene.

46. The olefin-acrylate block copolymer of any of embodiments 33-45, wherein the polyolefinyl group can be defined by the properties of R—H, and wherein R—H has a number average molecular weight of greater than 365 g/mol.

47. The olefin-acrylate block copolymer of any of embodiments 33-46, wherein the polyolefinyl group can be defined by the properties of R—H, and wherein R—H has a number average molecular weight of from greater than 365 g/mol to 10,000,000 g/mol, or from greater than 365 g/mol to 5,000,000 g/mol, or from greater than 365 g/mol to 1,000,000 g/mol, or from greater than 365 g/mol to 750,000 g/mol, or from greater than 365 g/mol to 500,000 g/mol, or from greater than 365 g/mol to 250,000 g/mol.

48. The olefin-acrylate block copolymer of any of embodiments 33-47, wherein the polyolefinyl group can be defined by the properties of R—H, and wherein R—H has a density from 0.850 to 0.965 g/cc, or from 0.860 to 0.950 g/cc, or from 0.865 to 0.925 g/cc. wherein the polyolefinyl group can be defined by the properties of R—H, and wherein R—H has a melt index (I2) from 0.01 to 2,000 g/10 minutes, or from 0.01 to 1,500 g/10 minutes, or from 0.1 to 1,000 g/10 minutes, or from 0.1 to 500 g/10 minutes, or from 0.1 to 100 g/10 minutes.

49. The olefin-acrylate block copolymer of any of embodiments 33-48, wherein the polyolefinyl group can be defined by the properties of R—H, and wherein R—H has a number average molecular weight distribution (Mw/Mn) from 1 to 10, or from 1 to 7, or from 1 to 5, or from 2 to 4.

50. The olefin-acrylate block copolymer of any of embodiments 33-49, wherein m is 1.

Test Methods

Density:

Density is measured in accordance with ASTM D-792, Method B.

Melt Index:

Melt index ($I_2$) is measured in accordance with ASTM D-1238, which is incorporated herein by reference in its entirety, Condition 190° C./2.16 kg, and was reported in grams eluted per 10 minutes.

GPC

Sample polymers were tested for their properties via GPC according to the following.

A high temperature Gel Permeation Chromatography system (GPC IR) consisting of an Infra-red concentration detector (IR-5) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Mixed A LS, 20 micron columns. The chromatographic solvent (TCB) and the sample preparation solvent were from the same solvent source with 250 ppm of butylated hydroxytoluene (BHT) and nitrogen sparged. The samples were prepared at a concentration of 2 mg/mL in TCB. Polymer samples were gently shaken at 160° C. for 2 hours. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 “cocktail” mixtures, with at least a decade of separation between individual molecular weights.

The GPC column set was calibrated before running the examples by running twenty-one narrow molecular weight distribution polystyrene standards. The molecular weight (Mw) of the standards ranges from 580 to 8,400,000 grams per mole (g/mol), and the standards were contained in 6 “cocktail” mixtures. Each standard mixture had at least a decade of separation between individual molecular weights. The standard mixtures were purchased from Polymer Laboratories (Shropshire, UK). The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight (Mw) component to minimize degradation. The polystyrene standard peak molecular weights were converted to polyethylene Mw using the Mark-Houwink constants. Upon obtaining the constants, the two values were used to construct two linear reference conventional calibrations for polyethylene molecular weight and polyethylene intrinsic viscosity as a function of elution column.

The polystyrene standard peak molecular weights were converted to polyethylene molecular weights using the following equation (as described in Williams and Ward, J. Polym. Sci., Polym. Let., 6, 621 (1968)):

$$M_{polyethylene}=A(M_{polystyrene})^B \quad (1)$$

Here B has a value of 1.0, and the experimentally determined value of A is around 0.41.

A third order polynomial was used to fit the respective polyethylene-equivalent calibration points obtained from equation (1) to their observed elution volumes of polystyrene standards.

Number, weight, and z-average molecular weights were calculated according to the following equations:

$$\overline{Mn} = \frac{\sum^{i} Wf_i}{\sum^{i} (Wf_i/M_i)} \quad (2)$$

$$\overline{Mw} = \frac{\sum^{i} (Wf_i * M_i)}{\sum^{i} Wf_i} \quad (3)$$

$$\overline{Mz} = \frac{\sum^{i} (Wf_i * M_i^2)}{\sum^{i} (Wf_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The accurate A value was determined by adjusting A value in equation (1) until Mw calculated using equation (3) and the corresponding retention volume polynomial, agreed with the known Mw value of 120,000 g/mol of a standard linear polyethylene homopolymer reference.

The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors could include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector was used for calculation purposes.

Data collection was performed using Viscotek TriSEC software, Version 3, and a 4-channel Viscotek Data Manager DM400. The system was equipped with an on-line solvent degassing device from Polymer Laboratories (Shropshire, UK). Suitable high temperature GPC columns could be used, such as four 30 cm long Shodex HT803 13 micron columns or four 30 cm Polymer Labs columns of 20-micron mixed-pore-size packing (MixA LS, Polymer Labs). The sample carousel compartment was operated at 140° C. and the column compartment was operated at 150° C. The samples were prepared at a concentration of 0.1 grams of polymer in 50 milliliters of solvent. The chromatographic solvent and the sample preparation solvent contain 200 ppm of butylated hydroxytoluene (BHT). Both solvents were sparged with nitrogen. The polyethylene samples were gently stirred at 160° C. for four hours (4 h). The injection volume was 200 microliters (μL). The flow rate through the GPC was set at 1 mL/minute.

NMR ($^{13}C$ and $^{1}H$):

NMR analysis was performed at room temperature using a standard NMR solvent, such as chloroform or benzene, and data was acquired on a Varian 500 MHz spectrometer.

Diffusion NMR: The experiment employed 2048 scans and a repetition time of 15 s. The spectrum was centered at 90 ppm and covered a bandwidth of 240 ppm. Self-diffusion coefficient (D) was measured by 1H and 13C-detected diffusion using the pulsed-field-gradient NMR with double stimulated echo to mitigate any artifact by thermal convection. In general, the method utilized spatial variation of magnetic field, i.e. magnetic field gradient (g), to physically label the spatial positions of molecular ensembles during a well-defined time interval, thereby coupling the NMR peak intensity to the self-diffusion (D) of each molecule. D is quantified using the Stejskal-Tanner equation (Eq. 5), where I and I0 represent the NMR signal intensity with/without gradient. $\gamma$ is the gyromagnetic ratio of nuclei, g is gradient strength, $\delta$ is the gradient pulse duration and $\Delta$ is the diffusion time. Bearing in mind that peaks from the same molecule must yield the same D, such a method enables inherent separation of NMR peaks by virtue of D associated with each peak without perturbing the spectra resolution. This method in nature can also be considered as an analogue to the size exclusion chromatography (SEC), i.e. large molecule diffuses slow/elute early or vice versa. Thus, the measurement provides explicit intermolecular information to reveal if the polymer backbone is capped by a specific end group by comparing $D_{end}$ vs. $D_{backbone}$.

$$I = I_0 \exp\left(-D\gamma^2\delta^2 g^2\left(\Delta - \frac{\delta}{3}\right)\right) \quad (5)$$

GCMS:

Tandem gas chromatography/low resolution mass spectroscopy using electron impact ionization (EI) is performed at 70 eV on an Agilent Technologies 6890N series gas chromatograph equipped with an Agilent Technologies 5975 inert XL mass selective detector and an Agilent Technologies Capillary column (HP1MS, 15 m×0.25 mm, 0.25 micron) with respect to the following:

Programed Method:

Oven Equilibration Time at 50° C. for 0.5 min then 25° C./min to 200° C., and hold for 5 min Run Time 11 min

EXAMPLES

The following examples are intended to illustrate some embodiments of the invention and should not be interpreted as limiting the scope of the invention set forth in the claims.

Unless stated otherwise, all materials and reagents are commercially available from, for example, Sigma Aldrich.

Example 1

2 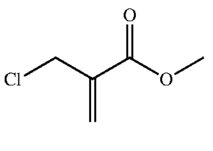 +

-continued

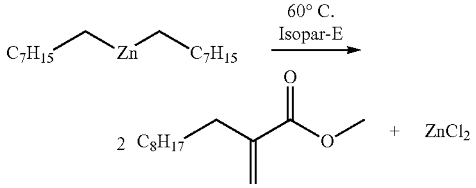

Figure 1B:
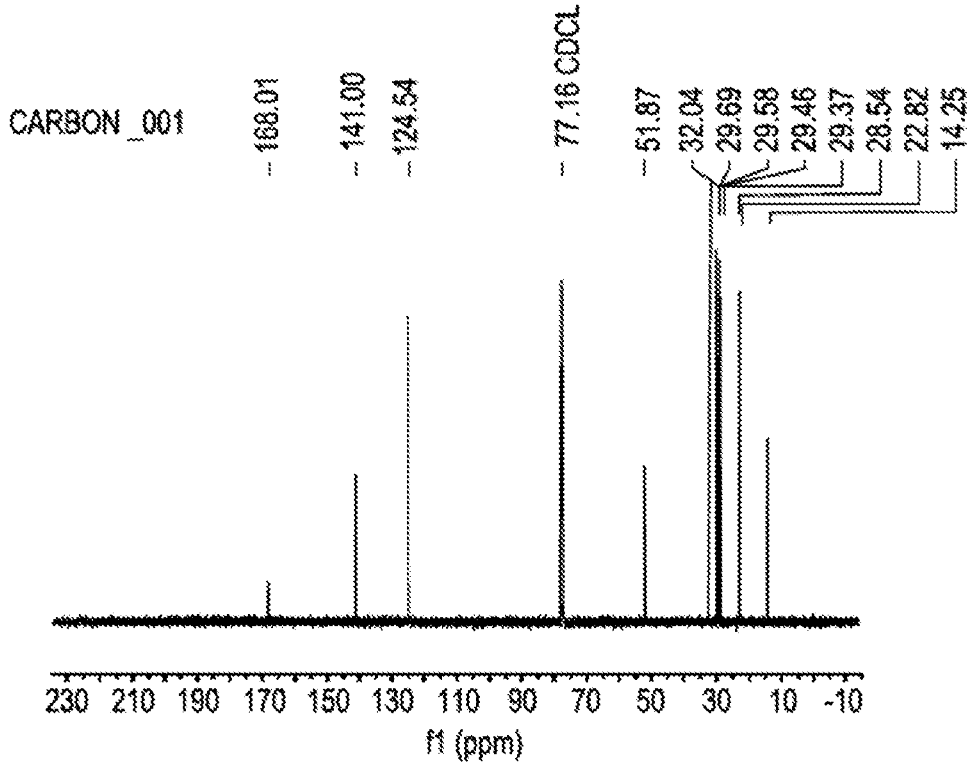
Figure 1C:
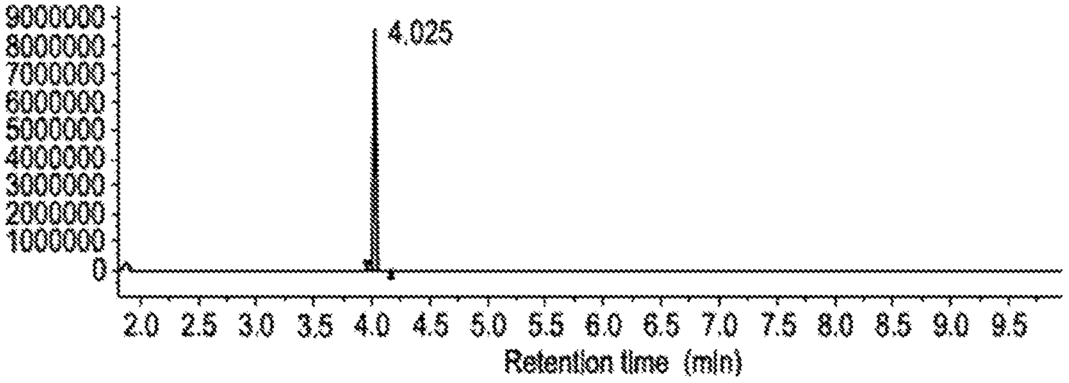
FIGS. 1C and 1D provide the GCMS spectra for Example 1.
Figure 1D:
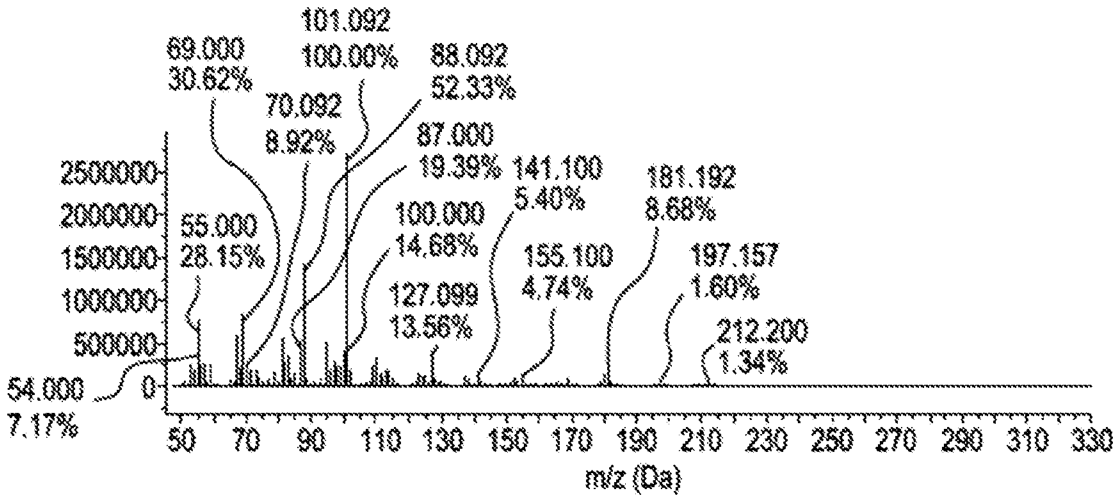

The reaction of Example 1 was performed under an inert nitrogen atmosphere glovebox and in accordance with the above reaction scheme which is exemplary and non-limiting. 5.88 mL of a 0.30 M dioctylzinc solution in Isopar™ E (1.76 mmol) was added to a 20 mL vial. The solution was heated to 60° C. 0.500 g methyl 2-(chloromethyl)acrylate (3.72 mmol, 2 equiv.) was added dropwise to the hot dioctylzinc solution. Over the course of the slow addition, the solution turned from light brown to clear and became cloudy with a visible white precipitate. After several minutes, the precipitate settled as a sticky yellow residue on the bottom of the vial. After 48 hours at 60° C., 83 mg of hexamethylbenzene (0.511 mmol) was added as an NMR internal standard. The NMR conversion was calculated to be 62.6%. NMR analysis is shown in FIGS. 1A and 1B. As seen in FIGS. 1C and 1D, GC-MS of a reaction aliquot showed formation of the desired product (lower retention time peaks correspond to Isopar™ E). The reaction was quenched with water. Purification to remove Zn salts and the internal standard was carried out by column chromatography eluting with a 2% ethyl acetate in hexanes mixture. 405 mg of product was isolated (51%).

Example 2

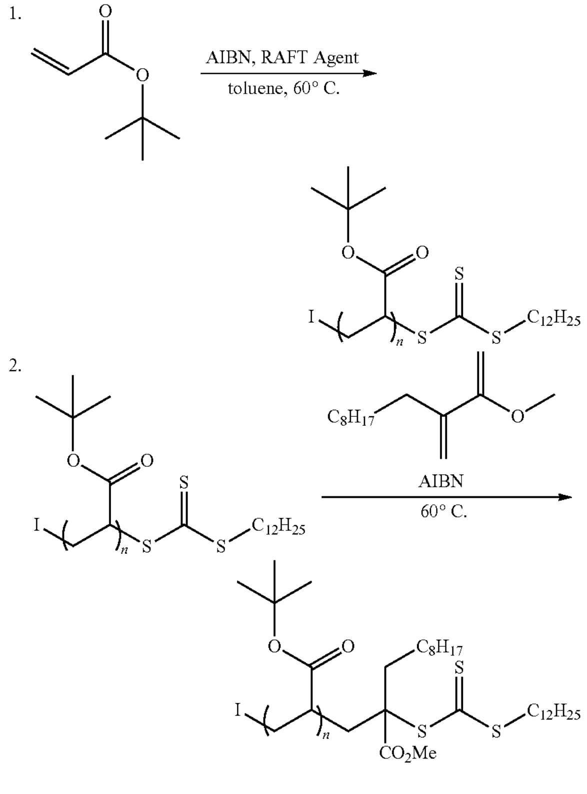

-continued

RAFT agent =

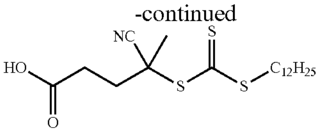

Reaction was performed in a nitrogen-atmosphere glovebox. t-butyl acrylate was passed through an alumina cartridge prior to start of the reaction to remove inhibitor. t-butyl acrylate (4 mL, 27.6 mmol), 0.2 M AIBN in toluene (0.140 mL, 0.028 mmol, 0.001 equiv.), 4-cyano-4-(((dodecylthio)carbonothioyl)thio)pentanoic acid (0.113 g, 0.280 mmol, 0.01 equiv.) were added to a 20 mL vial with a stirbar. The reaction mixture was heated to 60° C. and monitored by $^1$H NMR. After 3 hrs, the reaction mixture turned into a very viscous yellow liquid. Reaction was quenched by removing from the glovebox and exposing the vial to air. The viscous liquid was dissolved in 15 mL THF to redissolve the polymer. Polymer was precipitated by adding the THF solution to approximately 300 mL cold hexanes in a dry ice/acetone bath, quickly decanting the liquid, and collecting the yellow solid at the bottom of the jar while still submerged in the dry ice bath. The polymer was washed with chlorobenzene to remove excess hexanes and dried on the Schlenk line overnight.

Subsequently, the polymer was brought back into the glovebox and dissolved in approximately 3 mL toluene. The polymer was degassed by allowing the toluene solution to stir with the cap off the vial for 10 minutes. After adding the compound prepared in Example 1 and heating at 60° C. over the weekend, NMR showed reaction did not progress appreciably. Added an additional 59 uL of 0.2 M AIBN and continued to heat at 60° C. NMR again showed no reaction. An additional 2 mL of toluene was added to the reaction mixture to decrease the viscosity. 59 uL of 0.2 M AIBN was added and the reaction was heated to 60° C. After 48 hours, the reaction appeared to have taken place by the decrease in relative intensity of the methine signal.

Figure 2A:
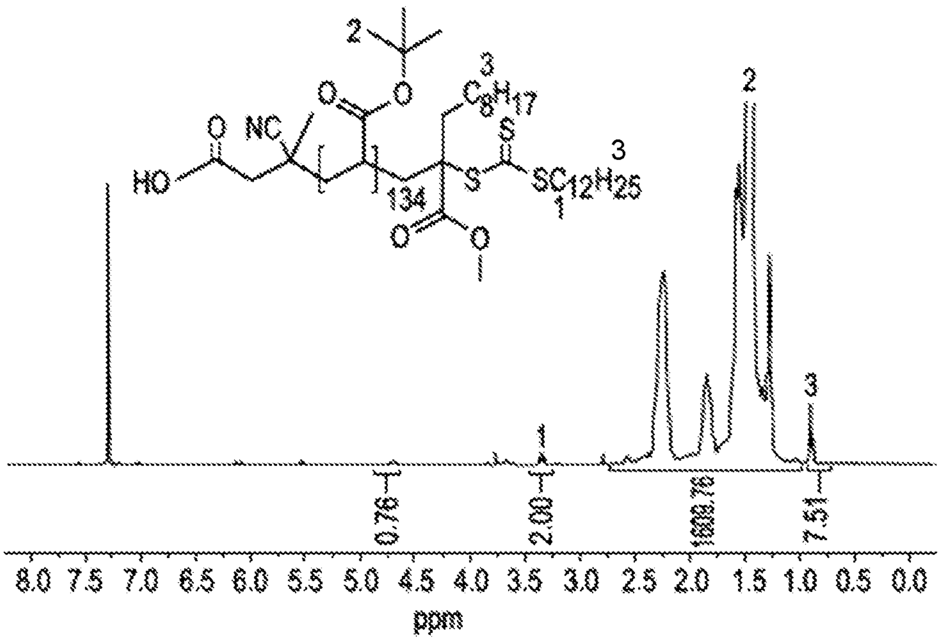
FIGS. 2A and 2B provide $^{1}H$ NMR and diffusion NMR spectra, respectively, for Example 2.
Figure 2B:
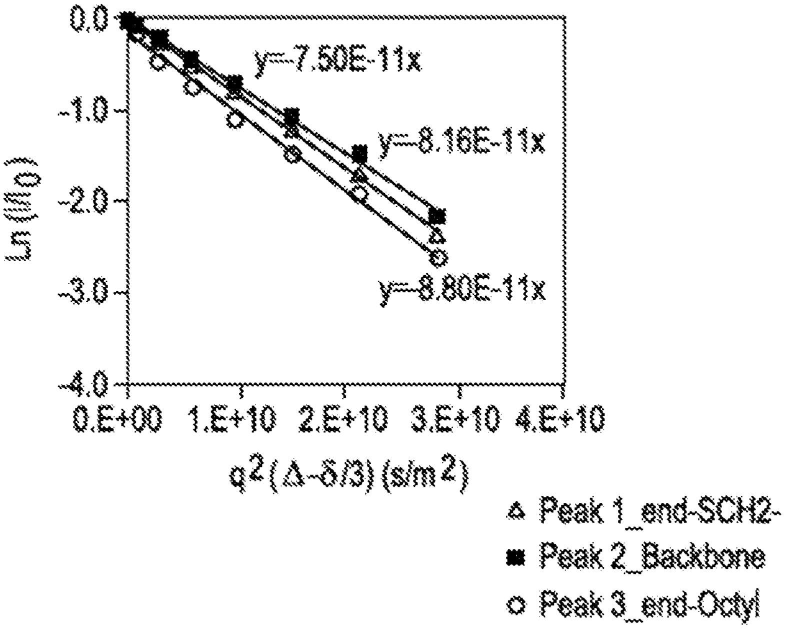

Polymer was precipitated by addition to cold hexanes cooled with a dry ice/acetone bath. The polymer was a yellow solid that turned back into a viscous goo as soon as the hexanes warmed slightly outside of the dry ice bath. Solvent was removed on the rotovap and Schlenk line (50° C.). NMR and diffusion NMR spectra for Example 2 are provided in FIGS. 2A and 2B, respectively. The following Table 1 provides certain data before and after the reaction of Example 2:

TABLE 1

| Mw | Mn (GPC) | Mn(1H NMR) | PDI |
|---|---|---|---|
| Before reaction | | | |
| 12960 | 11691 | 12981 | 1.11 |
| After reaction | | | |
| 13584 | 12348 | 13138 | 1.10 |

What is claimed is:

1. A process for preparing an olefin-acrylate block copolymer, the process comprising:

a) performing reversible addition-fragmentation chain-transfer (RAFT) polymerization by combining RAFT materials comprising of:

an acrylate monomer of formula (III):

(III)

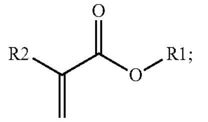

a radical initiator, and a RAFT agent of formula (IV):

(IV)

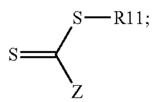

thereby forming a macroinitiator of formula (V):

(V)

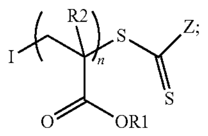

and b) polymerizing the macroinitiator of formula (V) with an alpha-substituted acrylate monomer of formula (II):

(II)

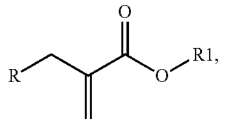

by combing the macroinitiator of formula (V) with the alpha-substituted acrylate monomer of formula (II) with a radical initiator, thereby forming the olefin-acrylate block copolymer of formula (VI):

(VI)

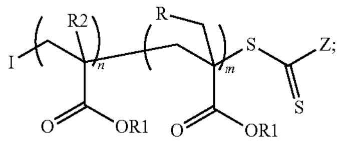

wherein each R1 independently is hydrogen or a C1-C30 hydrocarbyl group;

each R2 independently is hydrogen or a methyl group;

each wherein each R independently is a polyolefinyl group;

R11 is selected from the group consisting of optionally substituted alkyl; an optionally substituted saturated, unsaturated or aromatic carbocyclic or heterocyclic ring; optionally substituted alkylthio; optionally substituted alkoxy; and optionally substituted dialkylamino; and where R11 is a free-radical leaving group that can initiate free-radical polymerization;

each Z is selected from the group consisting of hydrogen, chlorine, optionally substituted alkyl, optionally substituted aryl, optionally substituted heterocyclyl, optionally substituted alkylthio, optionally substituted alkoxycarbonyl, optionally substituted aryloxycarbonyl (—COOR"), carboxy (—COOH), optionally substituted acyloxy (—$O_2$CR"), optionally substituted carbamoyl (—CONR"$_2$), cyano (—CN), dialkyl- or diarylphosphonato [—P(═O)OR"$_2$], and dialkyl- or diarylphosphinato [—P(═O)R"$_2$];

each R" independently is selected from the group consisting of optionally substituted C1-C18 alkyl, C2-C18 alkenyl, aryl, heterocyclyl, aralkyl, alkaryl wherein the substituents are independently selected from the group that consists of epoxy, hydroxy, alkoxy acyl, acyloxy, carboxy (and salts), sulfonic acid (and salts), alkoxy- or aryloxycarbonyl, isocyanato, cyano, silyl, halo, and dialkylamino; and each I independently is a radical initiator or a free radical leaving group resulting from R11 of the RAFT agent that initiates free radical polymerization;

each n independently is from 2 to 500; and m is from 1 to 50.

2. The process of claim 1, wherein the polyolefinyl group is an ethylene-based polymeryl group.

3. The process of claim 1, wherein the polyolefinyl group is a propylene-based polymeryl group.

4. The process of claim 1, wherein the polyolefinyl group is defined by the property of R—H, and wherein R—H has a number average molecular weight of greater than 365 g/mol.

5. The process of claim 1, wherein each of steps a) and b) is performed at a temperature from 40° C. to 150° C.

6. The olefin acrylate block copolymer prepared by the process of claim 1.

* * * * *